United States Patent
Geus

[11] Patent Number: 5,326,958
[45] Date of Patent: Jul. 5, 1994

[54] DRIVE DEVICE FOR PUSH-PULL WELDING TORCHES

[75] Inventor: Ewald Geus, Blasbach, Fed. Rep. of Germany

[73] Assignee: Alexander Binzel GmbH & Co. KG, Alten-Buseck, Fed. Rep. of Germany

[21] Appl. No.: 927,299
[22] PCT Filed: Mar. 18, 1991
[86] PCT No.: PCT/EP91/00511
§ 371 Date: Sep. 23, 1992
§ 102(e) Date: Sep. 23, 1992
[87] PCT Pub. No.: WO91/14530
PCT Pub. Date: Oct. 3, 1991

[30] Foreign Application Priority Data
Mar. 23, 1990 [DE] Fed. Rep. of Germany ....... 4009391

[51] Int. Cl.$^5$ ................................................ B23K 9/133
[52] U.S. Cl. ............................................... 219/137.31
[58] Field of Search ............... 219/137.2, 137.31, 137.7

[56] References Cited

U.S. PATENT DOCUMENTS

| | | | |
|---|---|---|---|
| 2,606,267 | 8/1952 | McElrath, Jr. | 219/137.7 |
| 2,719,245 | 9/1955 | Anderson. | |
| 3,529,127 | 9/1970 | Smith | 219/137.31 |
| 3,562,577 | 2/1971 | Kensrue | 219/137.7 |
| 3,811,611 | 5/1974 | Tholander et al. | |
| 4,179,056 | 12/1979 | Schmerling. | |
| 4,703,156 | 10/1987 | Hayes | 219/137.31 |
| 4,954,690 | 9/1990 | Kensrue | 219/137.7 |

FOREIGN PATENT DOCUMENTS 2107632 of 0000 France.
462344 of 0000 Switzerland.

Primary Examiner—Clifford C. Shaw
Attorney, Agent, or Firm—Price, Heneveld, Cooper, DeWitt & Litton

[57] ABSTRACT

Drive device for continuously consumable wire electrodes of electric welding torches, comprising a wire drive roller 5 arranged in a housing 1 having a handle 2 and a drive motor acting on the wire drive roller 5 via gearing 6 and arranged outside the wire feed axis, the drive unit consisting of drive motor 4, gearing 6 and wire drive roller 5 being arranged in a housing part 3 formed outside the area of the handle 2 enclosed by the hand. The consumable wire electrode and the supply lines are passing through the handle 2, and the motor shaft 10 of the drive motor 4 is arranged at right angles to the wire feed axis 8.

18 Claims, 1 Drawing Sheet

DRIVE DEVICE FOR PUSH-PULL WELDING TORCHES

The invention is aimed at a drive device for so-called push-pull welding torches having continuously consumable wire electrodes.

So-called push-pull welding torches, i.e. electric welding torches having a continuously consumable wire electrode, in which the wire electrode is driven and pulled, are known in principle.

U.S. Pat. No. 2,719,245 discloses a feeding device for feeding welding wire to welding torches, in which feeding device the handle of the welding gun extends perpendicularly to the feed direction of the welding wire. Arranged laterally next to the handle is the drive unit consisting of drive motor, gearing and wire drive roller, the motor shaft of the drive motor being arranged at right angles to the wire feed axis.

Described in U.S. Pat. No. 3,210,522 is a welding gun in whose handle the drive motor of the welding-wire feed unit is arranged. The handle is arranged at right angles to the wire feed axis, and the gearing and the wire drive roller are arranged above the handle in a housing. CH-A-462 344 discloses a welding torch wherein the handle is coaxial with the wire feed axis and the wire electrode is passed through the handle. The drive motor is positioned with in the area of the handle enclosed by the hand resulting in a thick handle difficult to grasp.

However, the disadvantage of the push-pull torches on the market is that they have an unfavorable distribution of weight and often large-sized handles which are difficult to grasp.

The object of the present invention is to provide a structural design for a drive device for continuously consumable wire electrodes of electric welding torches whose handle is designed to be small and easy to grasp and in which the drive unit is arranged with a well-balanced distribution of weight in a housing part connected to the handle.

This object is achieved by a drive device for continuously consumable wire electrodes of electric welding torches, comprising a housing having a handle and a housing part arranged outside the area of the handle enclosed by the hand and having a drive unit arranged therein consisting of a wire drive roller and a drive motor arranged outside the wire feed axis acting on the wire drive roller via gearing and the motor shaft of the drive motor running in a horizontal plane which is at a distance from the parallel horizontal plane in which the wire feed axis runs when the welding torch is in a horizontal position, characterized in that the handle is designed to be coaxial to the wire feed axis, and the wire electrode is passed through the handle and the housing part, the housing part for accommodating the drive unit for the wire electrode is formed on the front side or rear side of the handle and the drive motor is arranged in such way that its motor shaft runs at right angles to the wire feed axis whereby a perpendicular plane running longitudinally through the wire feed axis intersects the motor shaft of the drive motor in the area of its armature.

The handle is arranged coaxially to the wire feed axis. When the welding torch is in a horizontal position, the wire feed axis runs in a horizontal plane. Handle and housing part for the drive unit are arranged relative to one another in such a way that the wire is not deflected in the housing of the drive device. When the welding torch is in the horizontal position, the shaft of the drive motor runs in a horizontal plane which is at a distance from the parallel plane in which the wire feed axis runs, and the plane in which the motor shaft runs can be arranged below or above the horizontal plane in which the wire feed axis runs.

In one embodiment, the housing part for accommodating the drive unit is arranged on the front side or end face of the handle. In this case, the group of hoses is attached to the rear end of the handle, and not only the wire electrode but also the supply lines are passed through the handle of the housing part having the drive unit into the torch neck inserted into the end face of the housing part of the drive unit.

In another embodiment, the torch neck is directly attached to the front side or end face of the handle, and the housing part for accommodating the drive unit is located at the rear end or the rear end face of the handle and the group of hoses is directly attached to the housing part having the drive unit.

The spindle of the wire feed roller is preferably arranged either perpendicularly or parallel to the drive shaft of the drive motor.

The drive motor is preferably arranged transversely to the wire feed axis at a distance from it in the housing part for accommodating the drive unit. It is especially preferred to arrange the drive motor below the wire feed axis. Owing to the fact that there is a distance between the wire feed axis and the wire drive roller and the housing of the drive motor, the gearing for the positive connection between the spindle of the wire feed roller and the motor shaft can be arranged between the wire feed roller and the housing of the drive motor.

In order to obtain a particularly favorable distribution of weight relative to the wire feed axis, it is preferred to arrange the drive motor in such a position relative to the wire feed axis that a perpendicular plane running longitudinally through the wire feed axis intersects the motor shaft of the drive motor in the area of its armature.

The gearing for the positive connection between the shaft of the drive motor and the spindle of the wire drive roller is preferably worm gearing which is arranged between the wire drive roller and the housing of the drive motor. The actual positive connection between the worm shaft and the motor shaft is effected by means of a toothed belt running over toothed pulleys, a toothed pulley being arranged in each case on the worm shaft and the motor shaft.

Instead of a toothed belt, bevel gears can also be arranged on the shafts, which bevel gears produce a positive connection between the worm shaft and the motor shaft.

If the drive motor is not arranged perpendicularly to the spindle of the wire feed roller but parallel to it, the positive connection can be produced via meshing spur gears. In this embodiment, the distance between the spindle of the wire drive roller and the shaft of the drive motor is designed to be smaller, since no gearing needs to be arranged in between. The set of spur gears acts as the gearing.

In push-pull systems of this type, the continuously consumable wire electrode is driven at the rear end of the group of hoses, i.e. it is advanced and pulled and fed further in the area of the welding-torch handle by a wire-feed drive roller and a counterpressure roller interacting with it.

The housing having the housing part for accommodating the drive unit and the handle is preferably formed from two half shells which bear against one another in a plane running in the direction of the wire feed axis and are screwed to one another.

One half shell of the housing part for accommodating the drive unit has an opening which is closed by a lid and permits access to the wire feed roller and the pressure roller.

The handle can be equipped with the switch lever for actuating the welding torch in order to be able not only to hold the torch with one hand but also to start the welding torch and initiate and end the welding operation which the same hand.

Owing to the fact that, according to the invention, the supply lines and the wire electrode are passed through the handle, and the drive unit consisting of wire feed roller, gearing and motor is arranged with a good distribution of weight relative to the wire feed axis in a housing part adjoining the handle, a particularly easy-to-hold drive unit for electric push-pull torches is obtained.

The invention will now be described in greater detail with reference to the figures.

Figure 3:
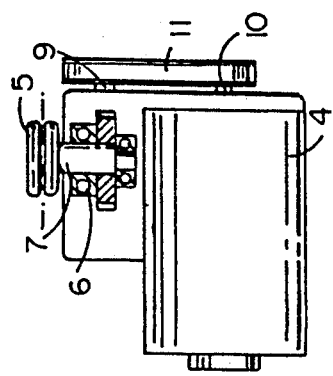
Figure 4:
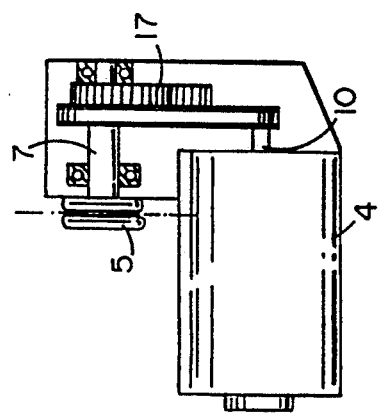

FIGS. 3 and 4 schematically show the arrangement of wire feed roller and drive motor inside the housing part.

Figure 1:
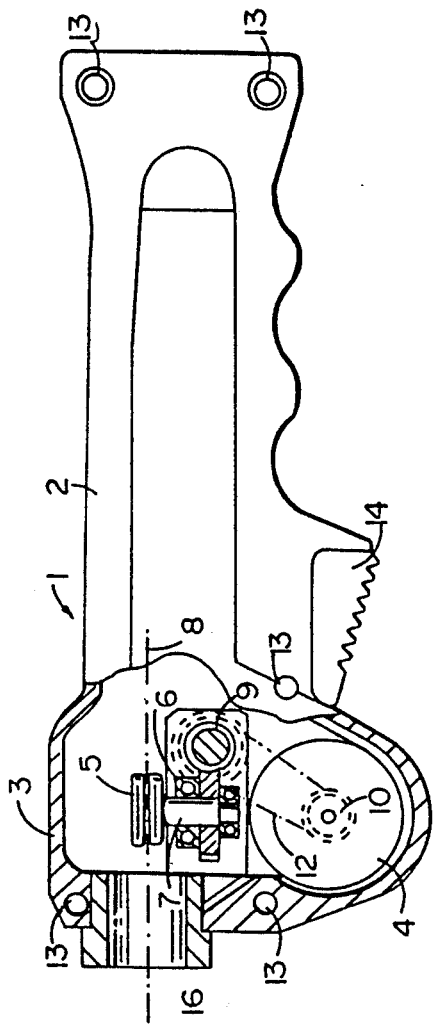
FIG. 1 shows an embodiment of the device according to the invention in longitudinal section from the side.

In FIG. 1 the housing of the drive device is designated by 1 and has a handle 2 and a housing part 3 for accommodating the drive motor 4 for the wire drive roller 5 likewise arranged in the housing part 3. Gearing 6 connects the motor shaft 10 of the drive motor 4 to the spindle 7 of the wire drive roller 5. In the embodiment reproduced in this figure, the housing part 3 is arranged on the front side of the handle 2 in such a way that the longitudinal axis of the handle 2 runs through the upper part of the housing part 3 for accommodating the drive unit. The spindle 7 of the wire drive roller 5 runs perpendicularly to the drive shaft 10 of the motor 4. The drive motor 4 is arranged transversely in the housing part 3 below the wire feed axis so that the motor shaft 10 runs at right angles to the wire feed axis in a horizontal plane which is at a distance from the horizontal plane in which the wire feed axis 8 runs. The gearing 6 is worm gearing which is arranged between the wire drive roller 5 and the housing of the drive motor 4. A positive connection between the worm shaft 9 and the motor shaft 10 is produced by a toothed belt 12 rotating over toothed pulleys arranged on the shafts 9, 10. The housing 1 is split in the longitudinal direction into two half shells which are held together by screws in the holes 13. The push-button or the lever of the switch (not shown) for switching on and ending the welding operation is designated by 14. The wire electrode (not shown) is passed along the wire feed axis 8 in the same way as the supply lines for the welding torch through the handle 2 and the housing part 3 to the torch neck of the welding torch, which is inserted into the opening 16 arranged on the end face of the housing part 3. In this embodiment, the group of hoses is attached to the rear end of the handle 2.

Figure 2:
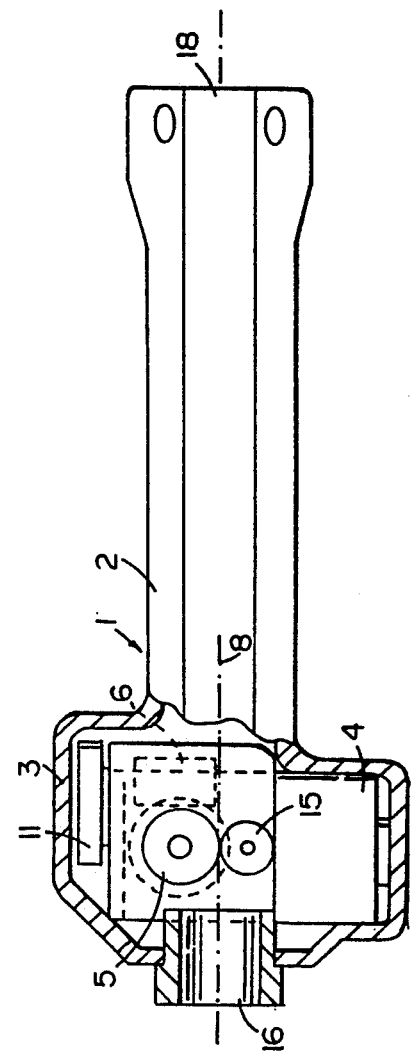
FIG. 2 shows this embodiment in longitudinal section from above.

FIG. 2 shows this embodiment in longitudinal section from above. The wire feed axis 8 runs tangentially to the margin of the wire drive roller 5. The continuously consumable wire electrode is pressed against the wire drive roller 5 by a counterpressure roller 15. The drive motor 4 is arranged in the housing part 3 in such a way that there is as uniform a distribution of weight as possible relative to the wire feed axis 8. A plane running in the direction of the wire feed axis 8 from top to bottom through the wire feed axis 8 intersects the drive motor 4 in the area of its armature winding. Consequently, the weight of the drive motor and of the gearing is distributed as symmetrically as possible relative to the wire feed axis. A toothed pulley 11 is in each case arranged on the drive shaft of the motor 4 and the worm shaft of the gearing 6. The gearing 6 is arranged below the wire feed roller and above the motor housing of the drive motor 4. The torch neck of the electric welding torch is inserted into the opening 16 on the end face of the housing part 3. At the rear end, the handle 2 has an opening 18 for passing through the supply lines and the consumable wire electrode from the group of hoses to be attached.

FIG. 3 schematically shows an arrangement of drive motor 4 and the worm gearing 6 arranged above the drive motor 4 and the wire drive roller 5 lying above the worm gearing 6, the spindle 7 of the wire drive roller 5 running perpendicularly to the motor shaft 10. Arranged on the motor shaft 10 and the worm shaft 9 are toothed pulleys 11 which are positively connected by means of a toothed belt. As shown in FIGS. 1 and 2, the motor 4 is arranged transversely to the wire feed axis.

FIG. 4 schematically shows another arrangement of drive motor 4 and wire feed roller 5 relative to one another, the drive shaft 10 and the spindle 7 of the wire feed roller 5 running parallel to one another in this embodiment. The positive connection between the spindle 7 and the shaft 10 is here made as gearing via spur gears 17.

I claim:

1. A drive device for continuously consumable wire electrodes of electric welding torches, comprising:
    a housing having a handle adapted to be enclosed by a user's hand and a housing part arranged outside the are of the handle, said housing part being formed on one of a front side or rear side of said handle; and
    a drive unit located in said housing part, said drive unit having a wire drive roller adapted to feed the wire electrode along a wire feed axis and having a drive motor arranged outside the wire feed axis, said drive motor acting on the wire drive roller via gearing, said drive motor having an armature on a motor shaft running in a first reference plane which is at a distance from a parallel second reference plane in which the wire feed axis runs, said handle and said housing part being adapted to be coaxial to the wire feed axis with the wire electrode passed through said handle and said housing part, said drive motor being oriented with said motor shaft at right angles to said wire feed axis whereby a third reference plane running longitudinally through said wire feed axis and running perpendicular to each of said first and second reference planes, intersects said motor shaft in the area of its armature.

2. The drive device according to claim 1, wherein said wire drive roller has a spindle and said spindle is oriented in one of a perpendicular or parallel relation to said motor shaft.

3. The drive device according to claim 1, wherein said gearing between said motor shaft and said wire drive roller includes a toothed belt.

4. The drive device according to claim 1, wherein said drive motor is positioned below said wire feed axis.

5. The drive device according to claim 1, wherein said gearing includes worm gearing which is arranged between said wire drive roller and said drive motor and includes a toothed belt rotating over toothed pulleys, a toothed pulley being arranged on said motor shaft.

6. The drive device according to claim 1, wherein said gearing includes worm gearing which is arranged between said wire drive roller and said drive motor and includes bevel gears, a bevel gear being arranged on said motor shaft.

7. The drive device according to claim 1, wherein said wire drive roller has a drive spindle, said drive spindle runs parallel to said motor shaft, and meshing spur gears interconnect said drive spindle and said motor shaft.

8. The drive device according to claim 1, wherein said housing is formed from two half shells which bear against one another in a plane running along said wire feed axis and which are screwed to one another.

9. An electric welding torch, comprising:
a housing with a handle adapted to be enclosed by a user's hand, said housing defining an electrode path along which an electrode is fed, said electrode path lying in a reference plane;
a drive unit located in said housing, said drive unit being adapted to feed the electrode along said electrode path, said drive unit including a drive motor, said drive motor having a shaft and an armature, said shaft being spaced from said electrode path and oriented generally perpendicular to said reference plane, said reference plane intersecting said armature.

10. The torch defined in claim 9 wherein said drive unit is positioned outside said handle.

11. The torch defined in claim 10 wherein said drive unit is positioned at one of two opposing ends of said handle.

12. The torch defined in claim 9 wherein said drive unit further includes an electrode drive roller, said roller being rotationally driven by a spindle, said spindle being connected with said shaft of said drive motor, said spindle being oriented in one of a perpendicular or parallel relation to said shaft of said drive motor.

13. The torch defined in claim 12 wherein said operative connection of said drive roller with said shaft of said drive motor includes at least one of a toothed belt, a worm gear, a bevel gear, or a spur gear.

14. An electric welding torch comprising:
a housing with a handle adapted to be enclosed by a user's hand, said housing defining an electrode path along which an electrode is fed, said electrode lying in a reference plane; and
a drive unit located in said housing at one end of said handle outside of said handle, said drive unit being adapted to feed the electrode along said electrode path, said drive unit including a drive motor, a drive roller adapted to drive the electrode, and gearing interconnecting said drive roller and said drive motor, said drive motor having a shaft and an armature, said shaft being spaced from said electrode path and oriented generally perpendicular to said reference plane, said reference plane intersecting said armature.

15. The torch defined in claim 14 wherein said drive unit is positioned outside said handle.

16. The torch defined in claim 15 wherein said drive unit is positioned at one of two opposing ends of said handle.

17. The torch defined in claim 14 wherein said drive unit further includes an electrode drive roller, said roller being rotationally driven by a spindle, said spindle being connected with said shaft of said drive motor, said spindle being oriented in one of a perpendicular or parallel relation to said shaft of said drive motor.

18. The torch defined in claim 17 wherein said operative connection of said drive roller with said shaft of said drive roller includes at least one of a toothed belt, a worm gear, a bevel gear, or a spur gear.

* * * * *

UNITED STATES PATENT AND TRADEMARK OFFICE
CERTIFICATE OF CORRECTION

PATENT NO. : 5,326,958
DATED : July 5, 1994
INVENTOR(S) : Ewald Geus

It is certified that error appears in the above-indentified patent and that said Letters Patent is hereby corrected as shown below:

Column 4, line 43;

"are" should be --area--.

Column 5, line 29;

After "plane;" insert --and--.

Column 6, lines 7 and 8;

Delete "operative".

Column 6, line 16;

After "housing" insert --,--.

Column 6, line 17;

After "handle" (first occurrence) insert --, and--.

Column 6, line 29;

"15" should be --14--.

UNITED STATES PATENT AND TRADEMARK OFFICE
CERTIFICATE OF CORRECTION

PATENT NO. : 5,326,958
DATED : July 5, 1994
INVENTOR(S) : Ewald Geus

Page 2 of 2

It is certified that error appears in the above-indentified patent and that said Letters Patent is hereby corrected as shown below:

Column 6, lines 32 and 33;

Delete "drive unit further includes an".

Column 6, lines 33 and 34;

Delete ", said roller being" and insert --is--.

Column 6, lines 38 and 39;

Delete "operative".

Column 6, line 40;

"drive roller" should be --drive motor--.

Signed and Sealed this

Tenth Day of January, 1995

*Attest:*

BRUCE LEHMAN

*Attesting Officer*      *Commissioner of Patents and Trademarks*